Dec. 15, 1964 L. S. SUOZZO 3,161,739
LEVEL AND POSITION SENSING SWITCH AND INDICATING
APPARATUS FOR PIPING OR THE LIKE
Filed May 15, 1961 2 Sheets-Sheet 1
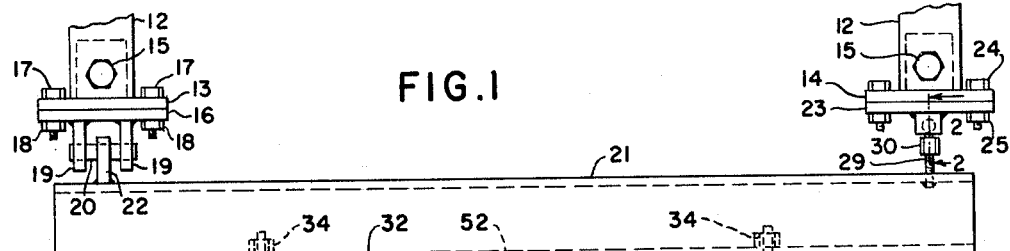
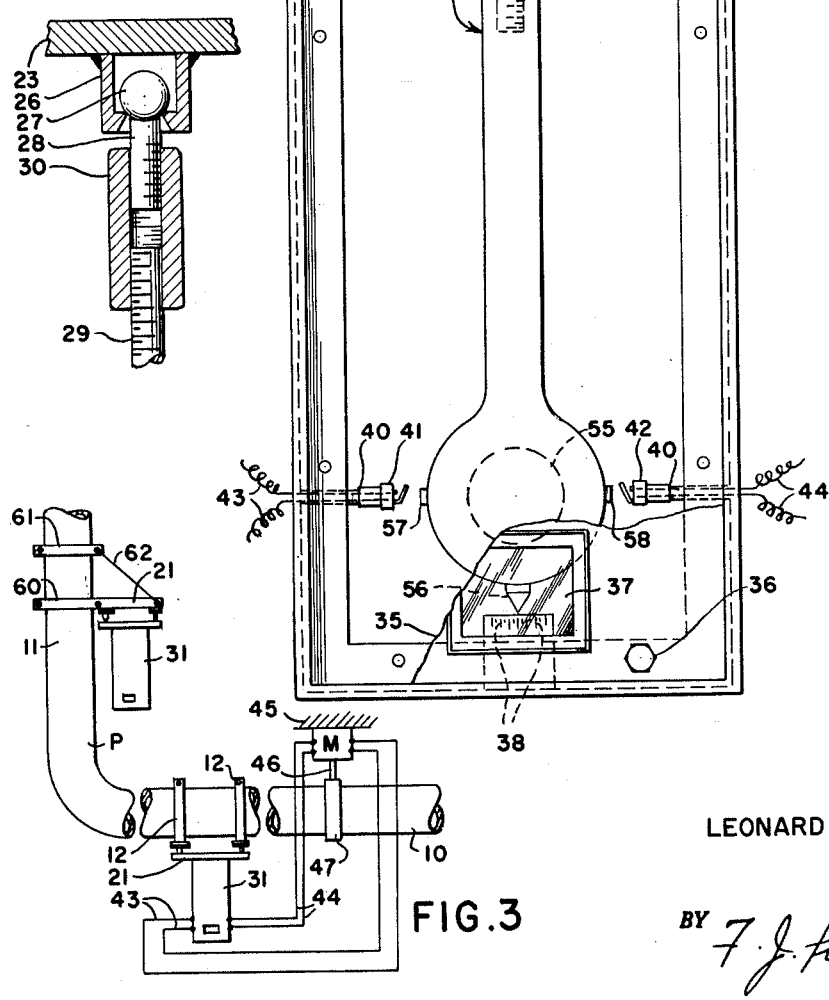
LEONARD S. SUOZZO
*INVENTOR.*
BY
ATTORNEY

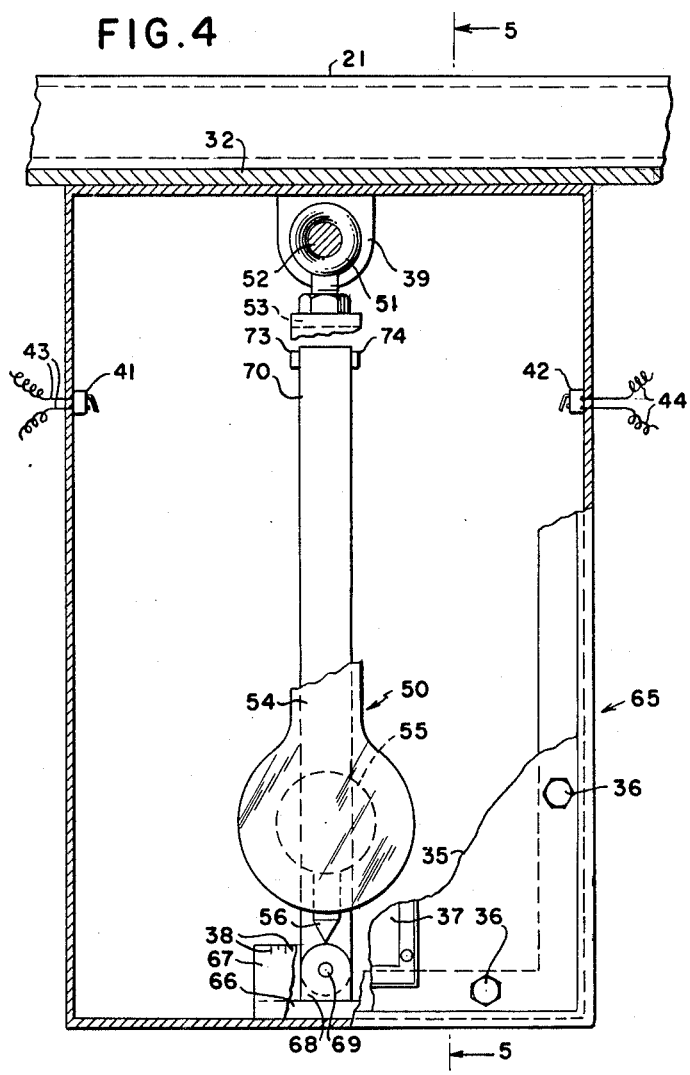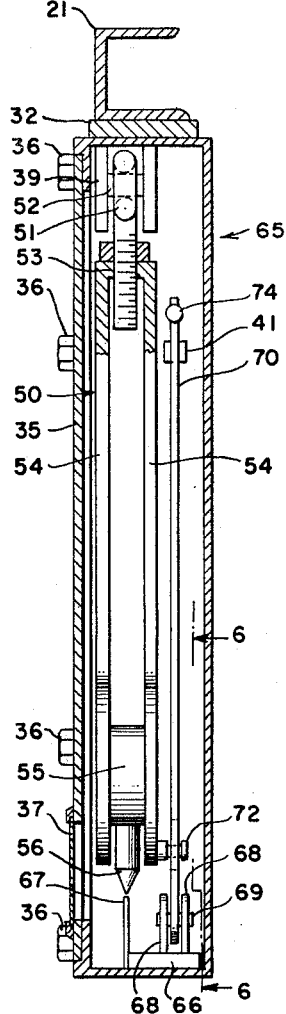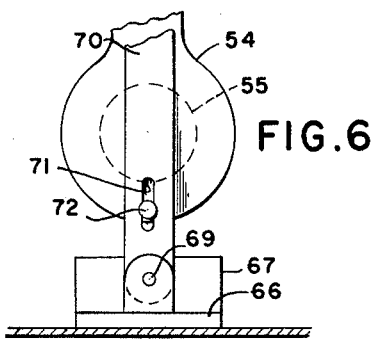

United States Patent Office 3,161,739
Patented Dec. 15, 1964

3,161,739
LEVEL AND POSITION SENSING SWITCH AND INDICATING APPARATUS FOR PIPING OR THE LIKE
Leonard S. Suozzo, Hackensack, N.J.
(50 Church St., New York, N.Y.)
Filed May 15, 1961, Ser. No. 109,886
7 Claims. (Cl. 200—61.52)

This invention relates to sensing apparatus in general and pertains, more particularly, to position sensing apparatus that is adapted for use with a load, such as piping, at least a portion of which is subjected to angular movement while in active use.

The position sensing apparatus of this invention has a number of uses. It is especially useful with piping loads and as an adjunct to support means for such loads. Accordingly and for the purposes of this application, the ensuing discussion and description and the accompanying drawings are directed to sensing apparatus of this invention as applied to piping loads.

Piping systems are utilized extensively in power plants and in various other types of installations to transmit steam or other high temperature fluids from one location to another. Changes in temperature of the fluid transmitted through the piping cause the piping to expand or contract depending on whether the fluid temperature is increased or decreased. It is important that the weight of the piping and its fluid contents be properly supported to prevent creation of undue and possibly dangerous stresses in the piping, as a consequence of expansion or contraction of the piping material. The proper support of the weight of such piping has been a matter of serious concern to industry for many years.

There have been a number of important advances in the art of support devices for piping and the like in recent years. Such advances are exemplified by my following patents: No. 2,903,213, granted September 8, 1959, for "Constant Support Device," and No. 2,939,663, granted June 7, 1960, for "Constant Support Device." The devices of these patents utilize spring forces to control vertical movement of a load.

Vertical movement of piping and similar loads may also be controlled by electro-mechanical devices which are devoid of springs, as disclosed in my pending patent applications Serial No. 45,394, entitled "Motor-Actuated Suspension Type Constant Support Device" now Patent No. 3,033,506, and Serial No. 45,395, entitled "Motor-Actuated Constant Support Device."

It has been ascertained that at least portions of piping loads, in many installations, are subjected to movements which result in angular deviations from a normal reference plane. It is important in instances of this type that such deviations be maintained within safe limits to prevent creation of undesirable stresses in the piping. There is no known present day equipment for properly sensing these deviations and for then placing a support device into service whereby to compensate for the deviations. My present invention has been developed to and does, in fact, adequately fulfill this need as will be appreciated by persons trained in the art from the detailed description appearing further along herein.

Accordingly, it is the primary object of this invention to provide sensing apparatus which is responsive to predetermined variations in the level or other angular position of a load, such as piping.

Another object of the invention is to provide position sensing apparatus for piping or the like, the sensing apparatus being adapted to cooperate with a support device for the piping whereby to place the support device into or out of active service, as required and in a manner to compensate for predetermined angular movement of the piping.

The invention has for a further object, the provision of position sensing apparatus for piping in which the moving parts are reduced to a substantial minimum and are protected against foreign particles, such as dust, dirt and the like.

A still further object of the invention is to provide a sensing device of the character indicated that is simple and compact in design; that is sturdy and durable in construction; that is reasonable in manufacturing, installation and maintenance costs; and that is adapted to perform its intended functions in a dependable and trouble-free manner.

The enumerated objects and additional objects, together with the advantages of this invention, will be readily understood by persons skilled in the art from the following detailed description taken in conjunction with the accompanying drawings which respectively describe and illustrate two forms of construction embodying the invention.

In the drawings, wherein like reference characters denote corresponding parts throughout the several views:

FIG. 1 is a view in front elevation of position sensing apparatus according to the invention, certain parts being broken away for better illustration of other parts;

FIG. 2 is an enlarged fragmentary view taken along line 2—2 of FIG. 1;

FIG. 3 is a view on a reduced scale illustrating the position sensing apparatus shown in FIG. 1 operatively associated with a horizontal section of a piping load and with a support device, this view also showing the load sensing apparatus operatively associated with a vertical section of the piping load;

FIG. 4 corresponds to FIG. 1 and illustrates a modification of the invention, certain parts being broken away for better illustration of other parts;

FIG. 5 is a view taken along line 5—5 of FIG. 4; and
FIG. 6 is a view taken along line 6—6 of FIG. 5.

Referring initially to FIG. 3, I have illustrated therein a length of piping P consisting of a generally horizontal section 10 and a generally vertical section 11. The load sensing apparatus shown in FIGS. 1 and 2 is adapted to be suspended from horizontal piping section 10 by means of suitable devices including straps 12, as shown in FIG. 3. Such devices also include a pair of identical upper brackets 13 and 14 which are connected to corresponding straps by bolts 15.

A first lower bracket 16 is connected to upper bracket 13 by bolts 17 and nuts 18. This bracket includes a pair of spaced depending ears 19 which carry a pivot pin 20. A channel member 21 has an upstanding lug 22 which projects into the space between bracket ears 19 and forms a pivot connection with pin 20. This arrangement not only permits pivotal movement of channel member 21 relative to bracket 16, but also permits limited movement of the channel member along pin 20 as allowed by ears 19.

A second lower bracket 23 is affixed to upper bracket 14 by bolts 24 and nuts 25. This bracket includes a depending socket member 26 which houses a spherical head 27 that is integral with a threaded rod 28 (FIG. 2). Socket member 26 and the head of rod 28 form a universal or swivel connection. An upstanding threaded rod 29 is connected to the other end of channel member 21 and is joined to rod 28 by an internally threaded tubular connector 30. The effective overall length of the arrangement consisting of rod 28, connector 30 and rod 29 may be increased by turning connector 30 in one direction and decreased by turning that connector in a reverse direction.

A housing unit 31 is suspended from channel member 21 through the medium of a plate 32, bolts 33 and nuts 34. The housing unit includes a cover 35 that is removably maintained in position by screws 36. A transparent window 37 is provided in the lower portion of the cover to permit viewing of graduations 38 on an indicator plate within the confines of the housing. The housing unit has a pair of spaced, depending, parallel plates 39 at its upper end.

The housing unit is equipped with a pair of spaced tubular member 40 which extend through corresponding side walls of that unit. Tubular members 40 are aligned and adjustable relative to each other and carry corresponding electric switches 41 and 42 at their inner ends. These switches are normally open. Switch 41 is provided with a pair of electric leads 43 which extend through its tubular member and are connected to a motorized support unit M (FIG. 3). Switch 42 is provided with a corresponding pair of electric leads 44 which extend through its tubular member and are connected to unit M. Unit M includes a reversible electric motor, gearing and a screw jack and may be the same as or similar to the support device disclosed in my said pending application Serial No. 45,394 to which reference may be had for details of construction and operation. Unit M is preferably suspended from an overhead support, as indicated at 45 in FIG. 3, and is connected to piping section 10 by means of a rod 46 and a strap 47, as also shown in FIG. 3. It is deemed sufficient for the purposes of this application to point out that, when one of the electric switches is closed, unit M is placed in active service and operates to impart upward movement to raise the portion of piping section 10 to which it is attached and, when the other electric switch is closed, unit M operates in reverse to lower said portion of piping section 10.

Positioned within housing unit 31 is a pivotally suspended, weighted unit 50 which is in the nature of a plumb device. Unit 50 comprises a threaded eye rod 51 that projects into the space between plates 39 and forms a low-friction pivotal connection therewith through the medium of a pivot pin 52 or other suitable means known to the art. Rod 51 is threadedly connected to a tap in the web 53 of an inverted U-shaped member which includes a pair of elongated arms 54. A weight member 55 is positioned between and secured to the lower end portions of arms 54 (FIG. 5). Attached to weight member 55 and projecting below arms 54 is a pointer 56 that is located in a vertical line which passes through the center of mass of unit 50 and the pivot connection between rod 51 and plates 39. Pointer 56 is cooperatively associated with scale graduations 38 whereby to indicate any angular deflections of housing unit 31 relative to the plumb device at any particular time.

A pair of contact or actuator elements, namely elements 57 and 58, are attached to the sides of the plumb device. These contact elements are aligned with and adapted to operate switches 41 and 42, respectively.

For the purpose of outlining the operation of the form of the invention shown in FIGS. 1, 2 and 3, it is assumed that the sensing apparatus shown in these views is assembled and operatively connected to horizontal piping section 10 and unit M. At the time of installation, channel member 21 and, therefore, housing unit 31 are adjusted to normal horizontal position relative to piping section 10 by turning tubular connector 30, as required, until the parts are in the relative position shown in FIG. 1. With the parts in this position, both actuators 57 and 58 are spaced from and out of engagement with switches 41 and 42 and motorized unit M is out of active service. The sensing apparatus is so constructed and arranged as to respond to predetermined variations in its angular position relative to a horizontal plane. If, for example, piping section 10 tilts downwardly and toward the right, as viewed in FIG. 3 a predetermined extent, housing unit 31 is correspondingly tilted and switch 42 is engaged by actuator 58, thereby closing an electric circuit to motorized unit M and placing that unit into active service. The motorized unit operates to raise the right end portion of piping section 10 and return it to normal position, at which time actuator 58 and switch 42 become disengaged, thereby placing unit M out of active service. Tilting movement of piping section 10 in a reverse direction, as vewed in FIG. 3, effects engagement between actuator 57 and switch 41. This again places unit M in active but reverse service, thereby lowering the right end portion of piping section 10, as viewed in FIG. 3, to return the same to normal position, at which time actuator 57 and switch 41 become disengaged and place unit M out of service.

If desired, the sensing mechanism shown in FIG. 2 may be mounted on vertical piping section 11 as shown in FIG. 3. The arrangement shown in FIG. 1 may be secured to piping section 11 by means of piping straps 60 and 61 and a guy wire 62, as illustrated in FIG. 3.

In the construction shown in FIG. 1, the normal distance between each actuator 57 and 58 and corresponding switches 41 and 42 is relatively short. In order to compensate for normal vibrations or "hunting" of the piping load and prevent accidental closing of either switch, it might be necessary to use a relatively tall and wide housing in some instances so as to provide greater spacing between the actuators and the switches. This is objectionable as it necessitates larger and more costly equipment and would require more space than might be available in a particular installation, such as electric power plants, where space is limited.

The form of the invention shown in FIGS. 4, 5 and 6 magnifies or amplifies variations in the angular position of the housing unit and permits use of a more compact housing while avoiding the possibility of either switch being accidentally closed as a result of vibrations or hunting. The construction shown in these views includes a housing unit 65 which is similar in most respects to earlier described housing unit 31 and differs thereover in that (1) it is shorter than housing unit 31, (2) it is deeper than housing unit 31 in order to accommodate additional devices positioned therein and (3) the electric switches 41 and 42 are located at a higher level than in housing 31.

As is best shown in FIGS. 4 and 5, a plate 66, which is attached to the bottom of the housing unit, supports a scale 67 having graduations 38. Plate 66 also supports a pair of spaced parallel arms 68 which carry a pivot pin 69. A lightweight elongated lever 70 is pivoted at its lower end to pin 69 and is provided with a slot 71 (FIG. 6). A second pin 72 is affixed to the lower end of inner arm 54 of plumb device 50. This pin registers with slot 71 and forms a combined pivot and sliding connection with lever 70. A pair of contact elements 73 and 74 is attached to the upper end of lever 70. These elements are adapted to contact switches 41 and 42, respectively, in response to pivotal movement of the lever about the axis of pin 69. It will be noted that the distance between pins 69 and 72 is short as compared to the distance between pin 72 and either of contact elements 73 and 74. As a consequence, slight tilting movement of the housing unit relative to the plumb device will result in an amplified corresponding arcuate movement of contact elements 73 and 74 in response to angular movement of lever 70 about pin 69. This allows contact elements 73 and 74 to travel a substantial distance in an arcuate path before engaging their respective switches 41 and 43. The construction embodied in this form of the invention permits the use of a shorter and, if desired, narrower housing unit than that shown in FIG. 1 with attendant cost and space economies, and eliminates the possibility of either the contact elements accidentally engaging its switch due to vibrations or hunting of the housing unit in use.

From the foregoing, it is believed that the construction, operation, objects and advantages of my present invention will be readily comprehended by persons skilled in the art, without further description. It is to be clearly understood, however, that various changes in the constructions described above and illustrated in the drawings may be made without departing from the scope of the invention, it being intended that all matter contained in the description or shown in the drawings shall be interpreted as illustrative only and not in a limiting sense.

I claim:

1. In apparatus for use with a load, such as piping, at least a portion of which is subjected to angular movement in opposite directions while in active service, said apparatus comprising support means adapted to be secured to the load and subjected to said angular movement of said portion of the load, said support means comprising a member and a pair of spaced coupling devices attached to the member and adapted to be secured to the load, a first unit secured to and movable with the member, and a second unit comprising a plumb device depending from and pivotal relative to the member, one of the units including electric switch means, the other unit including means for operating the switch means in response to predetermined angular movement of the first unit in at least one direction.

2. Apparatus according to claim 1 wherein one of the coupling devices includes a pivotal connector and the other coupling device includes a swivel connector.

3. In apparatus for use with a load, such as piping, at least a portion of which is subjected to angular movement in opposite directions while in active service, said apparatus comprising support means adapted to be secured to the load and subjected to said angular movement of said portion of the load, said support means comprising a member and a pair of spaced coupling devices attached to the member and adapted to be secured to the load, a first unit carried by and movable with the member, said first unit including a pair of normally open electric switches, and a second unit including a plum device carried by the member and switch actuator means attaced directly to the plumb device, said actuator means effecting closing of one of the switches in response to predetermined angular movement of the first unit in one direction and effecting closing of the other switch in response to predetermined angular movement of the first unit in a reverse direction.

4. Apparatus according to claim 3 wherein the first unit includes a housing, wherein the switches are positioned in the housing in spaced relation to each other, wherein the second unit is disposed in the housing and wherein the plumb device is positioned between the switches, the apparatus also including indicator means within the housing for visibly denoting the angular position of the first unit relative to the plumb device, said housing being provided with a window to permit viewing of the indicator means.

5. In Apparatus for use with a load, such as piping, at least a portion of which is subjected to angular movement in opposite directions while in active service, said apparatus comprising support means adapted to be secured to the load and subjected to said angular movement of said portion of the load, a first unit carried by and movable with the support means, said first unit including a pair of normally open electric switches, a second unit including a plumb device pivotally suspended from the support means, a lever pivotally connected to the first unit and forming a combined pivotal and sliding connection with the plumb device, switch actuator means carried by the lever to the side of the pivotal connection between the lever and the plumb device which is remote from the pivotal connection between the lever and the first unit, said actuator means effecting closing of one of the switches in response ot predetermined angular movement of the first unit in one direction and effecting closing of the other switch in response to predetermined angular movement of the first unit in a reverse direction.

6. Apparatus according to claim 5 wherein the distance from the actuator means to the pivotal connection between the lever and the plumb device is substantially greater than the distance from the pivotal connection between the lever and the plumb device to the pivotal connection between the lever and the first unit.

7. Apparatus according to claim 6 wherein the first unit includes a housing, wherein the switches are positioned in the housing in spaced relation to each other, wherein the second unit is disposed in the housing and wherein the plumb device is positioned between the switches, the apparatus also including indicator means within the housing for denoting the angular position of the first unit relative to the plumb device, said housing being provided with a window to permit viewing of the indicator means.

References Cited in the file of this patent

UNITED STATES PATENTS

| 2,618,712 | Moledzky | Nov. 18, 1952 |
| 2,645,858 | Davis | July 21, 1953 |
| 2,652,125 | Dewhirst | Sept. 15, 1953 |
| 2,826,655 | Wurm | Mar. 11, 1958 |
| 2,911,509 | Millerwise | Nov. 3, 1959 |

FOREIGN PATENTS

| 416,057 | France | July 28, 1910 |